United States Patent [19]

Woods

[11] Patent Number: 4,671,577
[45] Date of Patent: Jun. 9, 1987

[54] COMBINED REGENERATIVE AND FRICTION BRAKING SYSTEM FOR A VEHICLE

[75] Inventor: David H. Woods, Mississauga, Canada

[73] Assignee: Urban Transportation Development Corporation Ltd., Toronto, Canada

[21] Appl. No.: 799,773

[22] Filed: Nov. 21, 1985

[51] Int. Cl.$^4$ .......................... B60L 7/10; B60T 13/74; F16D 65/36; H02K 49/00

[52] U.S. Cl. ......................................... 303/3; 188/156; 188/159; 180/165; 180/197; 303/20; 303/100; 303/101; 318/372; 318/376; 318/383; 364/426

[58] Field of Search .............. 303/3, 20, 6 R, DIG. 1, 303/7, 14, 15–17, 93, 22 R, 22 A, 94–110; 188/156, 159, 158, 160–165, 181, 47; 192/1, 2, 3 R; 180/197, 165; 364/426, 424; 318/371, 372, 376, 378, 383

[56] References Cited

U.S. PATENT DOCUMENTS

| | | |
|---|---|---|
| 2,052,201 | 8/1936 | Logan, Jr. et al. ................. 188/156 |
| 2,368,726 | 2/1945 | Piron ................................. 188/156 X |
| 2,926,759 | 3/1960 | Lichtenfels ....................... 318/371 X |
| 2,933,350 | 4/1960 | Hines ................................ 188/159 X |
| 3,488,570 | 1/1970 | Vint, Jr. et al. ................. 188/159 X |
| 3,547,499 | 12/1970 | Maskery ............................ 303/3 X |
| 3,774,095 | 11/1973 | Coccia ................................ 318/371 |
| 3,845,991 | 11/1974 | Engle ..................................... 303/3 |
| 4,270,806 | 6/1981 | Venkataperumal et al. ........... 303/3 |

Primary Examiner—Douglas C. Butler
Attorney, Agent, or Firm—Rogers, Bereskin & Parr

[57] ABSTRACT

A vehicle supported for rolling movement on a track by a first set of wheels driven by an electric motor and a second unpowered set of wheels is provided with an improved braking system. The braking system includes a brake pedal which can be depressed to generate a brake demand signal, a regenerative braking system associated with the electric motor, and a friction braking system attached to the unpowered wheels. Control circuitry which regulates the operation of the two brake systems serves normally to actuate the regenerative braking system in response to the brake demand signal and to actuate the friction braking system only when the brake demand signal exceeds a predetermined level which corresponds normally to the maximum regenerative braking available. Under slippery rail conditions, a detector indicates slippage of the wheels relative to the rails during regenerative braking, and immediately actuates the friction braking system to produce additional braking in proportion to the brake demand signal. The braking system thus maximizes regeneration under optimal rail conditions and enhances braking under poor rail conditions.

9 Claims, 5 Drawing Figures

COMBINED REGENERATIVE AND FRICTION BRAKING SYSTEM FOR A VEHICLE

FIELD OF THE INVENTION

The invention relates generally to vehicle braking systems, and in particular to braking systems aboard electrically powered vehicles in which regenerative braking can be employed on some powered wheels and conventionl friction braking on other unpowered wheels.

BACKGROUND OF THE INVENTION

Electrically powered vehicles are commonly used in urban transportation systems in which the vehicles travel along rails and obtain power either directly from the rails or from the rails in combination with an overhead power line. Such vehicles are commonly provided with two types of braking systems: a "regenerative braking system" in which the electric motor normally driving the vehicle is conditioned during braking to operate as a generator thereby permitting recapture of the vehicle's kinetic energy during braking, and a "friction braking system" which normally involves frictional engagement of a braking member between stationary and rotating members of the vehicle's wheels. Friction braking merely dissipates the vehicle's kinetic energy as heat, and therefore use of friction braking is preferably minimized. Another consideration is to ensure proper braking under poor rail conditions, particularly the low adhesion characteristic of rain-dampened rails.

According to a known system, when an operator aboard an electrically powered urban transit vehicle depresses his brake pedal, he provides a brake demand signals which is initially responded to by the regenerative braking system. The regenerative braking system provides a braking effect in general proportion to the magnitude of the brake demand signal until that signal exceeds a predetermined level which normally corresponds in substance to the limit of the regenerative braking available. At that point, the friction braking system is actuated to provide any additional demand required. In typical applications, regenerative braking associated with a particular powered truck supporting the vehicle may be used to provide braking up to for example, 3.5 miles per hour per second (mph/sec) with no braking from friction sources being used. This will effectively call for adhesion of the powered trucks of around 4.8 mphs, for a typical vehicle. These figures will depend of course in large measure on the adhesion available between the vehicle wheels and the rails and also the distribution of weight throughout the vehicle. On a wet track, regenerative braking might typically be limited to 2.0 mph/sec, the wheels then tending to spin or slide relative to the track with further regenerative braking. To accommodate the sliding associated with poor rail conditions, such a braking system has been equipped with a slide detector which together with associated control circuitry applies essentially anoscillatory brake demand signal to the braking system, causing the regenerative braking system to repeatedly brake until sliding is detected and then reduce braking to a level below the threshold at which sliding occurs. Because the brake demand signal has been reduced below the level required for actuation of the friction braking system, only regenerative braking is available, and the braking capability of the vehicle is very significantly impaired. If an emergency situation arises in which the operator requires additional braking, such as a vehicle stopped on the rails, the operator will normally have available to him a track brake which physically engages the rails of the track to provide emergency braking. Use of such a track brake is very undesirable because of attendant damage to the track.

As an object of the invention in the context of a transportation system of the type described is to provide a vehicle with an improved braking system which can be adapted if desired to maximize regeneration under good rail conditions and to provide more effective, balanced braking under poor, slippery rail conditions.

BRIEF SUMMARY OF THE INVENTION

In a vehicle supported for rolling movement by a multiplicity of wheels including a first set of wheels which are driven by an electric motor and a second set of wheels (which will normally be undriven), the invention provides an improved braking system. The braking system includes means operable by an operator aboard the vehicle for generating a brake demand signal indicative of the level of braking required by the operator, a regenerative braking system associated with the electric motor, a friction braking system associated with the second set of wheels, and means for detecting slippage of the wheels relative to a surface on which the vehicle rolls, during regenerative braking. Control means which respond to the slippage detecting means and the brake demand signal regulate the operation of the regenerative and friction braking systems. The control means serves normally to actuate the regenerative braking system in response to the brake demand signal and to actuate the friction braking system when a brake demand signal exceeds a predetermined level (normally selected to correspond to the maximum regenerative braking which can be obtained). When slippage is detected during regenerative braking, normally an indicator of slippery rail conditions, the control means responds by thereupon actuating the friction braking system to supplement the regenerative braking system, thereby overriding normal operation and providing more balanced and effective braking to accommodate the slippage problem.

BRIEF DESCRIPTION OF THE DRAWINGS

For a better understanding of the present invention, and to show more clearly how it may be carried into effect, reference will now be made, by way of example, to the accompanying drawings, in which.

DESCRIPTION OF THE PREFERRED EMBODIMENT

Figure 1:
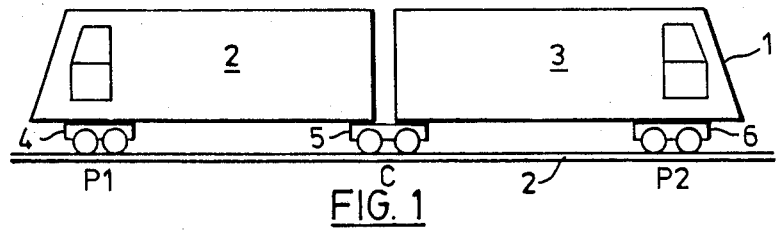
FIG. 1 shows diagramatically a side view of a vehicle.

In FIG. 1, there is shown a vehicle, which in this case is a railway vehicle, the vehicle being denoted by the reference 1. The vehicle 1 is arranged for travel along tracks 2. Although a railway vehicle is shown, it is to be appreciated that the invention is applicable to other types of vehicle as well. Here, the railway vehicle 1 is articulated, and it has first and second sections 2, 3 mounted on three trucks 4, 5 and 6. Truck 4 is a first power truck P1, whilst truck 6 is a second power truck P2. The truck 5 is a center truck C, on which ends of both the sections 2, 3 of the vehicle 1 are pivotally mounted. In contrast to the powered trucks 4, 6, the center truck 5 has unpowered wheels.

Figure 2:
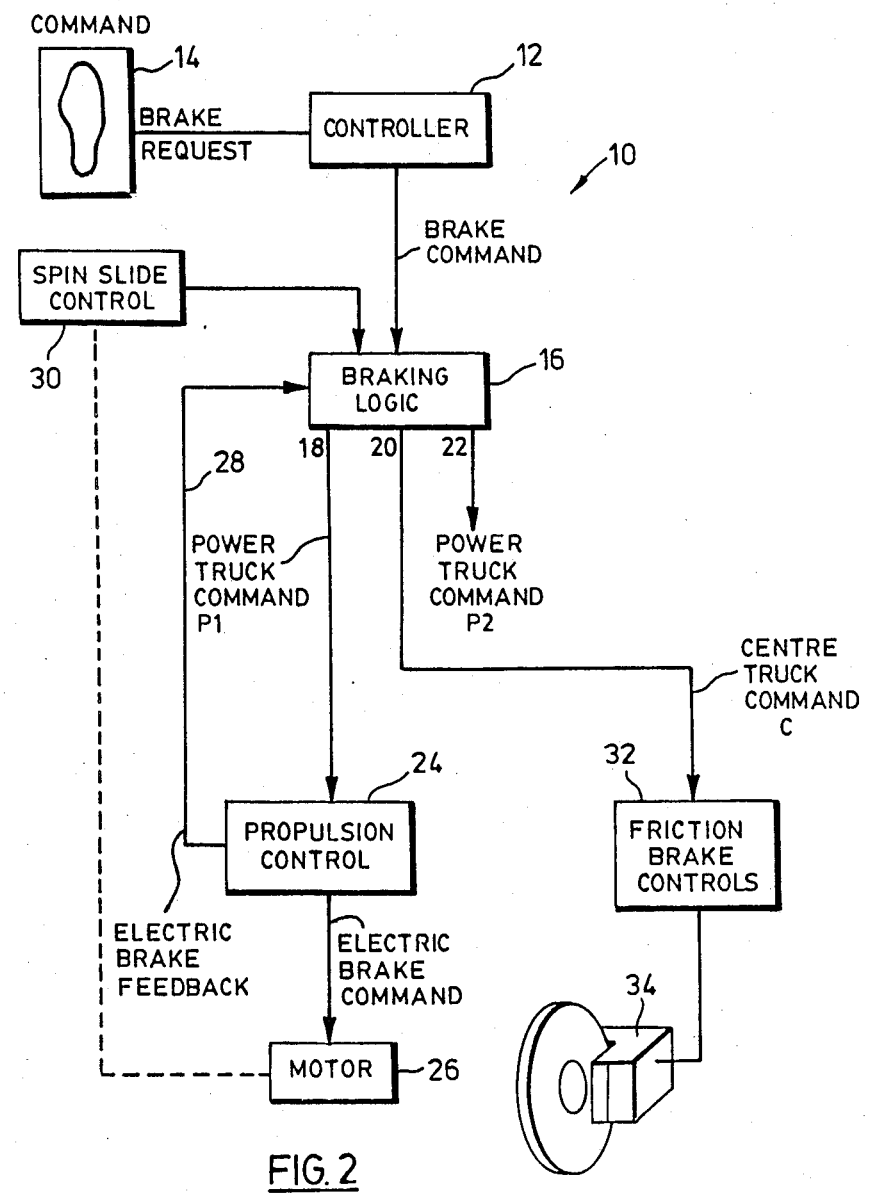
FIG. 2 shows schematically a braking system of a vehicle.

With reference to FIG. 2, there is shown the circuit of a braking system for the vehicle 1. The braking system is generally denoted by the reference 10. The braking system 10 includes a controller 12, which is connected to an input device 14, such as foot-operated pedal, which supplies a brake request signal to the controller 12. The controller 12 in turn is connected to braking logic 16, and supplies a brake command signal to it. The braking logic 16 in this embodiment, has three outputs 18, 20, 22, corresponding to the three trucks 4, 5 and 6. The two outputs 18, 22 are connected to the two powered trucks 4, 6. As the control arrangement for each of the powered trucks 4, 6 is the same, it is only shown in detail for the first, powered truck 4; it is the same for the powered truck 6.

The output 18 of the braking logic 16 is connected to a propulsion control unit 24. This propulsion control unit 24 controls a motor 26 of the powered truck 4. Although not shown, the propulsion control unit also includes an input for at least a drive signal command, when normal tractive effort is required from the motor. The propulsion unit 24 controls the motor 26, according to the control signals received A feedback line 28 feeds back to the braking logic 16 information on the braking effort provided by the motor 26. The braking logic 16 can then adjust the regenerative braking provided by the motor 26, as controlled by the propulsion control unit 24. A spin-slide control 30 is also provided, with a view to preventing the wheels of the trucks locking and sliding, and provides a means for detecting slippage during regenerative braking. It is connected to a further input of the braking logic 16. As indicated by a dotted line, the spin-slide control can be connected to the motor 26, to detect the occurrence of a slide condition, although this can be detected by other means.

The output 20 of the braking logic 16 is connected to a friction brake control 32, which in turn controls a friction brake 34 for the central truck 5.

A description of the operation of the braking system 10 will now be given, with reference to FIGS. 3-5.

Figure 3:
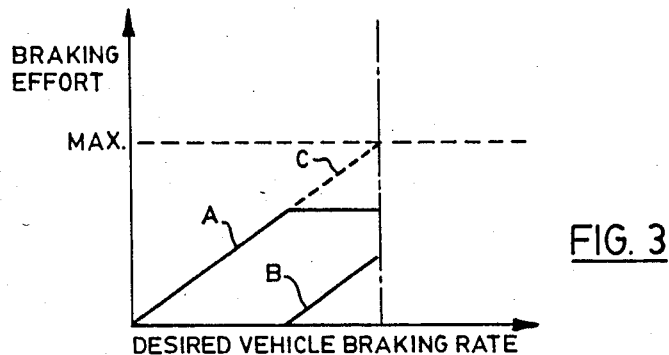
FIG. 3 shows a graph of braking effort against braking demand.

Referring first to FIG. 3, there is shown a graph of the braking effort or force provided against the brake command or desired vehicle braking right. This is shown for good conditions with dry rails. Curve A shows the combined regenerative braking from both power trucks 4 and 6. As the brake command is increased, the braking effort increases linearly in response, until a maximum is reached. This maximum is determined by the friction and the load on the particular truck. Thereafter, even if the brake command is increased, the braking effort cannot be increased. This braking using a power truck is achieved by regenerative braking, which effectively recovers the kinetic energy of the vehicle. If further braking is required, then friction braking is used on the center truck 5. The curve B shows the behaviour of the friction brake for this center truck 5, and how it co-operates with the regenerative braking represented by curve A. When the maximum of the regenerative braking is reached, if further braking effort is demanded, then the friction brake is brought in.

As shown by the slope of the first part of curve B, a progressive increase in the friction braking effort is provided, as the brake demand is further increased. Again, the friction brake effort provided will eventually reach a maximum, and no further increase in braking effort is then available. Assuming the load on each truck is the same and as indicated by curves A and B, the combined maximum braking effort from the two trucks 4, 6 is approximately twice the maximum braking effort available from the center truck 5. Curve C represent the ccmbined effect of the regenerative braking and the friction braking, i.e. curves A and B combined. Thus, as the brake demand is increased, braking is first provided by regenerative braking on the power trucks. When this reaches a maximum, to further increase the brake effort, the friction brakes are applied to the central, unpowered truck 5.

To effect braking, the foot pedal 14 is operated, to send a brake request signal to the controller 12. The controller 12 in turn sends a brake command signal to the braking logic 16, dependent on the depression of the foot pedal 14. The braking logic 16 is turn controls the various braking devices. Thus, at the onset of braking, the braking logic initially controls the propulsion units for the two power trucks 4, 6, to provide only regenerative braking. Feedback from the propulsion control units enables the braking logic 16 to maintain the required level of braking. The braking logic will take the regenerative braking up to a maximum, as determined by various factors. For example, the braking logic 16 can be such as to consider one or more of the following factors:

(a) The weight of the vehicle, and the weight on each truck;

(b) Rail condition-if rail condition is poor then the braking available from each truck is reduced;

(c) Partial failure or shortfall in electric or regenerative brakes.

Once the maximum regenerative braking is achieved, as determined by the braking logic, any further demand for braking effort is met by applying the brakes to the center truck 5. Thus, a further increase in the brake command signal will cause the braking logic 16 to actuate the friction brake control 32 and thus the friction brake 34.

A particular problem arises, if poor rail conditions are present. Typically poor rail conditions result from rain, etc., which reduces friction between the wheels and track. This reduces the maximum available regenerative braking from the powered trucks. Any attempt to increase the braking effort above the available maximum, simply causes the wheels to lock and slide, which is highly undesirable.

A known spin-slide system simply backs off the brakes if the wheels lock and slide, to release the wheels. Whilst this enables the wheels to rotate again, it reduces the braking effort. No provision is made for replacement of the braking effort from another braking source because the conventional "preferred" braking mode will not allow the demand to rise high enough to call in friction braking on the center truck. Thus, even if the operator is increasing the brake command signal, the control system may simply be maintaining the braking effort at a constant level consistent with that which will not cause a slide on the power trucks. In the known system, the friction braking is only applied when the regenerative braking reaches a maximum. As, for poor rail conditions, this maximum can never be achieved, the friction braking is never applied. As a result, the total braking effort is limited not only by the poor rail conditions but also by the absence of friction braking.

Figure 4:
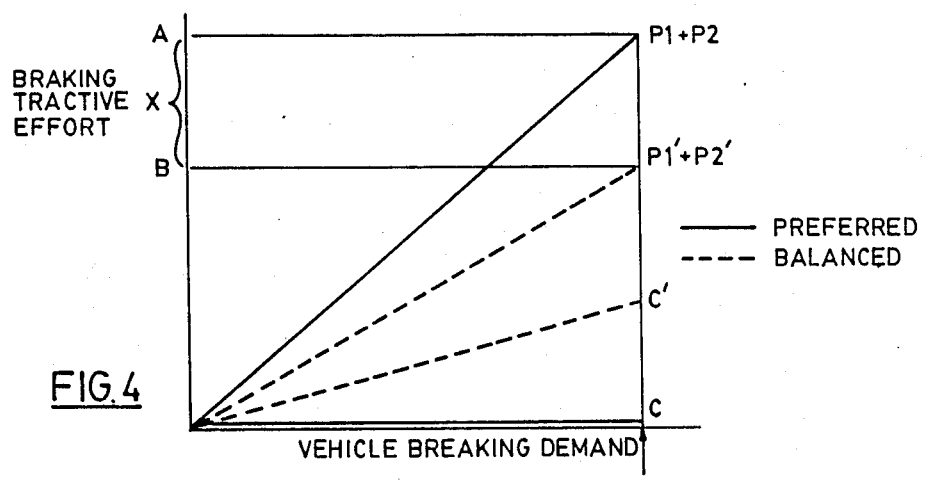
FIG. 4 shows a further graph of braking effort against braking demand.
Figure 5:
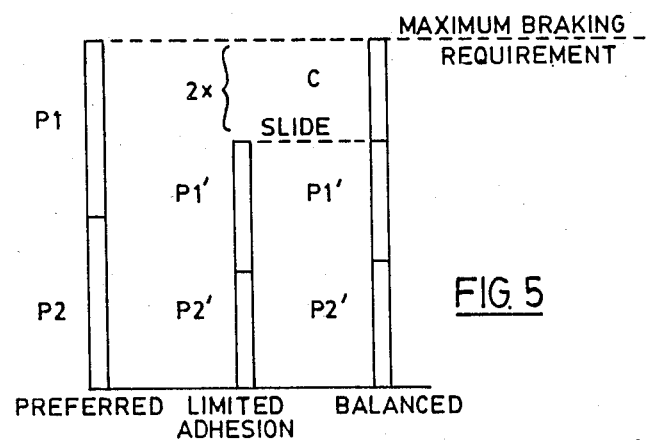
FIG. 5 shows a diagram showing how the braking effort is provided in different cases.

Reference will now be made to FIG. 4, which shows the variation of braking tractive effort with vehicle braking rate, for both good and poor rail conditions. In FIG. 4 the solid lines indicate the braking effort provided by two powered trucks (P1 and P2) and the center, unpowered truck (C), under good conditions. This represents a "preferred" mode, as all the braking is regenerative. Under this condition, as the braking command or desired vehicle braking rate is increased, then the braking tractive effort for each of the power trucks 4, 6 is progressively increased, until it reaches the maximum A. For normal conditions, this should provide ample braking capacity, and friction braking from the center truck should not be required.

Now, if poor rail conditions obtain, then the maximum braking tractive effort available from the two powered trucks is represented by the line B. When the braking effort reaches this level, sliding will commence. This is detected by the spin-slide control 30, which then causes the braking logic 16 to switch from the "preferred" mode to a "balanced" mode. Whereas in the preferred mode only the power trucks 4, 6 provide braking effort, in the balanced mode all the trucks 4, 5 and 6 will contribute towards the braking effort. This is shown by the dotted lines. The top dotted line shows the braking effort that will be provided by the two powered trucks 4, 6 and is marked P1' and P2'. The braking effort from the center truck 5 will be slightly less than that available from each powered truck as it is less heavily loaded than the end trucks 4, 6; it is marked C'. In this balanced mode, as shown by the dotted lines, the braking effort is distributed in the same proportion, for all required braking rates. This is in contrast to the arrangement of FIG. 3, where the regenerative braking is always used to a maximum, and only when the maximum is reached is the friction braking introduced.

Once the control system is switched to balanced braking, the vehicle will stay in balanced braking whilst in the braking configuration. Usually, the braking configuration will obtain, until foot pedal 14 is released and positive traction reapplied. Thus, once in balanced braking, the braking effort to the trucks will follow lines P1' and P2', and C' down to zero. As an alternative, when sliding occurs, the corresponding braking effort of the powered trucks can be noted. Then, once in balanced braking, if the braking demand is reduced, the braking effort of all the trucks can be reduced uniformly until the total braking effort is below that which could be supplied by regenerative braking of the powered trucks without slipping. Then, the braking system reverts to regenerative braking. At all times, the spin-slide control monitors wheel slippage and will revert to balanced braking if slippage of the wheels of trucks 4, 6 is detected. In this respect it is to be noted that the maximum braking effort under poor rail conditions can vary considerably. Thus, the value of the maximum braking effort B, and hence the difference, 2×, between it and the maximum, good rail, braking effort A can vary greatly. It will depend on such factors as water on the rails and debris, eg. leaves on the rails.

As shown on the left-hand side of FIG. 6 with good rail conditions the two power trucks 4, 6 provide all the braking effort, indicated by P1, P2. Under poor rail conditions for example, the power trucks can only provide a braking effort P1', P2', resulting in a shortfall of 2× (center column of FIG. 6), dependent on how poor the rail conditions are. Then, as shown on the right-hand side of FIG. 6, this short fall is made up by a braking effort C' from the center truck 5.

Whilst one can rely solely on a spin-slide control 30, to switch from the preferred to the balanced mode, other techniques are possible. For example, the vehicle can be provided with an override switch, to enable the operator to switch the braking logic 16 to the balanced mode. For example, for a particular journey, the operator might know or anticipate that he will be encountering many patches of bad rail conditions, and it is therefore desirable to have the braking logic 16 permanently in the balanced mode.

I claim:

1. A vehicle supported for rolling movement by a multiplicity of wheels including a first set of wheels driven by an electric motor and a second set of wheels, the vehicle having a braking system comprising:
   braking means operable by an operator aboard the vehicle for generating a brake demand signal whose magnitude is indicative of the level of braking required by the operator;
   a regenerative braking system connected to the electric motor;
   a friction braking system connected to the second set of wheels;
   means for detecting slippage of the wheels relative to a surface on which the vehicle rolls during regenerative braking;
   control means responsive to the slippage detecting means and the brake demand signal for regulating the operation of the regenerative and friction braking systems, the control means serving normally to actuate the regenerative braking system to produce regenerative braking in response to the brake demand signal and to actuate the friction braking system when the brake demand signal exceeds a predetermined level to produce additional braking, the control means responding to the detection of the said slippage during regenerative braking by thereupon actuating the friction braking system to produce additional braking in response to the brake demand signal.

2. A vehicle as claimed in claim 1, wherein the braking means includes a command device operable by an operator aboard the vehicle for generating a brake request signal, and the control means includes braking logic, which is supplied with the brake request signal, which is responsive thereto, and which is connected to the regenerative and friction braking systems to control said systems.

3. A vehicle as claimed in claim 2, in which the braking means includes a controller interposed between the brake command device and the braking logic, the controller responding to the brake request signal to generate a brake command signal.

4. A vehicle as claimed in claim 3, in which the regenerative braking system includes a propulsion control unit, which is connected to the braking logic and the motor, and which controls the motor to provide regenerative braking, dependent upon control signals from the braking logic.

5. A vehicle as claimed in claim 2, 3 or 4, wherein the braking logic is such that, after detection of slippage and actuating of friction braking, both regenerative and friction braking are maintained whilst the vehicle is in a braking configuration.

6. A vehicle as claimed in claim 4, wherein a feedback connection is provided from the propulsion control unit to the braking logic, to enable the braking logic to monitor the regenerative braking and adjust that braking accordingly.

7. A vehicle as claimed in claim 3, 4 or 6, wherein the friction braking system includes a friction brake control, which is connected to the braking logic and to the friction brakes, to control the friction brakes, in dependence upon control signals from the braking logic.

8. A vehicle as claimed in claim 3, 4 or 6, in which a spin-slide control is connected to the braking logic, so that the braking logic can limit the regenerative braking, to prevent sliding.

9. In a transportation system including a track and a vehicle supported for rolling movement on the track, the vehicle including a first truck with a set of wheels driven by an electric motor and a second truck with a set of unpowered wheels, a braking system comprising:

means operable by an operator aboard the vehicle for generating a brake demand signal whose magnitude is indicative of the level of braking required by the operator;

a regenerative braking system connected to the electric motor;

a friction braking system connected to the wheels of the second truck;

means for detecting slippage of the wheels relative to the track during regenerative braking;

control means responsive to the slippage detecting means and the brake demand signal for regulating the operation of the regenerative and friction braking systems, the control means serving normally to actuate the regenerative braking system to produce regenerative braking in response to the brake demand signal and to actuate the friction braking system when the brake demand signal exceeds a predetermined level to produce additional braking, the control means responding to the detection of the said slippage during regenerative braking by thereupon actuating the friction braking system to produce additional braking in response to the brake demand signal.

* * * * *